United States Patent
Weinfield et al.

(10) Patent No.: US 10,708,808 B2
(45) Date of Patent: Jul. 7, 2020

(54) SYSTEMS AND METHODS FOR RECEIVING/TRANSMITTING BASIC SAFETY MESSAGES AND IP COMMUNICATIONS WITH A DSRC RADIO

(71) Applicants: DENSO International America, Inc., Southfield, MI (US); DENSO CORPORATION, Kariya, Aichi-pref. (JP)

(72) Inventors: Aaron Weinfield, Encinitas, CA (US); Susan Graham, Solana Beach, CA (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/978,483

(22) Filed: May 14, 2018

(65) Prior Publication Data
US 2019/0349802 A1   Nov. 14, 2019

(51) Int. Cl.
| H04W 28/02 | (2009.01) |
| H04W 4/40 | (2018.01) |
| H04W 4/02 | (2018.01) |
| H04W 4/80 | (2018.01) |
| H04W 12/06 | (2009.01) |
| H04W 4/021 | (2018.01) |
| H04W 52/24 | (2009.01) |

(Continued)

(52) U.S. Cl.
CPC ..... *H04W 28/0247* (2013.01); *H04L 63/0823* (2013.01); *H04W 4/021* (2013.01); *H04W 4/026* (2013.01); *H04W 4/027* (2013.01); *H04W 4/40* (2018.02); *H04W 4/80* (2018.02); *H04W 12/06* (2013.01); *H04W 28/0226* (2013.01); *H04W 48/10* (2013.01); *H04W 52/243* (2013.01)

(58) Field of Classification Search
CPC ..... H04W 28/2047; H04W 4/80; H04W 4/40; H04W 4/021; H04W 4/026; H04W 4/027; H04W 12/06; H04W 28/0226; H04W 48/10; H04W 52/243; H04L 63/0823
See application file for complete search history.

(56) References Cited

U.S. PATENT DOCUMENTS

| 2006/0161340 A1* | 7/2006 | Lee ......... G01C 21/26 701/408 |
| 2009/0073880 A1* | 3/2009 | Park ......... H04L 67/322 370/235 |

(Continued)

*Primary Examiner* — Christopher M Crutchfield
*Assistant Examiner* — Tito Q Pham
(74) *Attorney, Agent, or Firm* — Harness, Dickey & Pierce, P.L.C.

(57) ABSTRACT

Systems and method for using a single dedicated short range communication (DSRC) radio of a vehicle to receive basic safety messages (BSMs) and to communicate with an internet server. The method includes the following: transmitting and receiving BSMs with the single DSRC radio of the vehicle on a safety channel; receiving with the DSRC radio on the safety channel an advertisement transmitted by roadside equipment, the advertisement regarding internet connectivity to a server; and establishing a connection between a vehicle communication module of the vehicle and the server with the DSRC radio in accordance with the advertisement.

18 Claims, 4 Drawing Sheets

(51) Int. Cl.
    *H04L 29/06*     (2006.01)
    *H04W 48/10*     (2009.01)

(56) References Cited

U.S. PATENT DOCUMENTS

| | | | |
|---|---|---|---|
| 2009/0121898 A1* | 5/2009 | Jia | G07B 15/063 |
| | | | 340/928 |
| 2011/0131238 A1* | 6/2011 | Peeters | G08G 1/0104 |
| | | | 707/769 |
| 2014/0081718 A1* | 3/2014 | Leopold | G07B 15/02 |
| | | | 705/13 |
| 2015/0256534 A1* | 9/2015 | Goudy | H04L 63/0823 |
| | | | 713/156 |
| 2017/0032402 A1* | 2/2017 | Patsiokas | G06Q 30/0266 |
| 2017/0053530 A1* | 2/2017 | Gogic | H04W 4/046 |
| 2017/0347359 A1* | 11/2017 | Yang | H04W 72/0473 |
| 2018/0004933 A1* | 1/2018 | Nathanson | H04W 4/44 |
| 2019/0088135 A1* | 3/2019 | Do | G08G 1/096791 |

\* cited by examiner

SYSTEMS AND METHODS FOR RECEIVING/TRANSMITTING BASIC SAFETY MESSAGES AND IP COMMUNICATIONS WITH A DSRC RADIO

FIELD

The present disclosure relates to systems and methods for receiving/transmitting basic safety messages and communicating with an internet server using a single vehicle DSRC radio.

BACKGROUND

This section provides background information related to the present disclosure, which is not necessarily prior art.

Dedicated short range communication (DSRC) vehicle-to-vehicle/infrastructure (V2X) technology relies on the periodic transmission of a basic safety message (BSM) containing a vehicle's current 3D position (latitude, longitude, and elevation), speed, heading, brake and turn signal status, and other vehicle information on a single safety channel dedicated to the BSM and other defined messages. With V2X technology, vehicles can have improved safety by knowing more about surrounding vehicles. Safety applications within each vehicle use local host vehicle (HV) information and the received BSM information from remote vehicles (RV) to predict potential collision situations. The safety channel is a single, pre-defined DSRC channel, which the BSM is transmitted on. With prior art systems, it is necessary for each vehicle to always have a DSRC radio tuned to the safety channel so that it can reliably receive BSMs from surrounding vehicles.

Road-side equipment (RSE) may be installed at intersections (or other locations) to facilitate V2X safety by transmitting information to vehicles regarding traffic signal status by way of signal phase and timing (SPAT) and map messages. Another use for the RSEs is to provide methods for the V2X onboard equipment (OBE) to communicate with servers on the internet by way of DSRC. In this case, the RSE transmits wireless access in vehicular environments (WAVE) service advertisement (WSA) messages to advertise internet protocol connectivity (such as IPv6), and the onboard equipment establishes a connection (such as an IPv6 connection) to the desired server on the internet when desired. One example of a server is a security credential management system (SCMS), used to provision and maintain security certificates on the OBEs.

V2X OBE device manufacturers currently have the option of making devices with one or more DSRC radios. If the device only supports one radio, then it must stay tuned to the safety channel to insure that it is reliably receiving BSMs from surrounding vehicles, and the type and amount of messages allowed to be transmitted is limited. If the device supports multiple DSRC radios, then the additional radios may be used to transmit/receive on other DSRC channels, while still monitoring the safety channel with the first radio. Undesirably, the cost of the V2X device increases as additional radios are added.

While current systems and methods for transmitting/receiving DSRC messages and establishing an IP connection to a server on the internet are suitable for their intended use, they are subject to improvement. The present disclosure thus advantageously provides for systems and methods for V2X onboard equipment (OBE) to operate using a single DSRC radio and safely perform IP (such as IPv6) communication for communicating with an RSE, while not negatively impacting the channel congestion level for other devices, as explained in detail herein. The present disclosure advantageously reduces costs, facilitates and expedites manufacturing, and reduces energy consumption during operation. One skilled in the art will appreciate that the present disclosure provides numerous additional advantages and unexpected results, as described in detail herein and as one skilled in the art will appreciate.

SUMMARY

This section provides a general summary of the disclosure, and is not a comprehensive disclosure of its full scope or all of its features.

The present disclosure provides for systems and methods for using a single dedicated short range communication (DSRC) radio of a vehicle to receive basic safety messages (BSMs) and to communicate with an internet server. An exemplary method includes the following: transmitting and receiving BSMs with the single DSRC radio of the vehicle on a safety channel; receiving with the DSRC radio on the safety channel an advertisement transmitted by road-side equipment, the advertisement regarding internet connectivity to a server; and establishing a connection between a vehicle communication module of the vehicle and the server with the DSRC radio in accordance with the advertisement.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
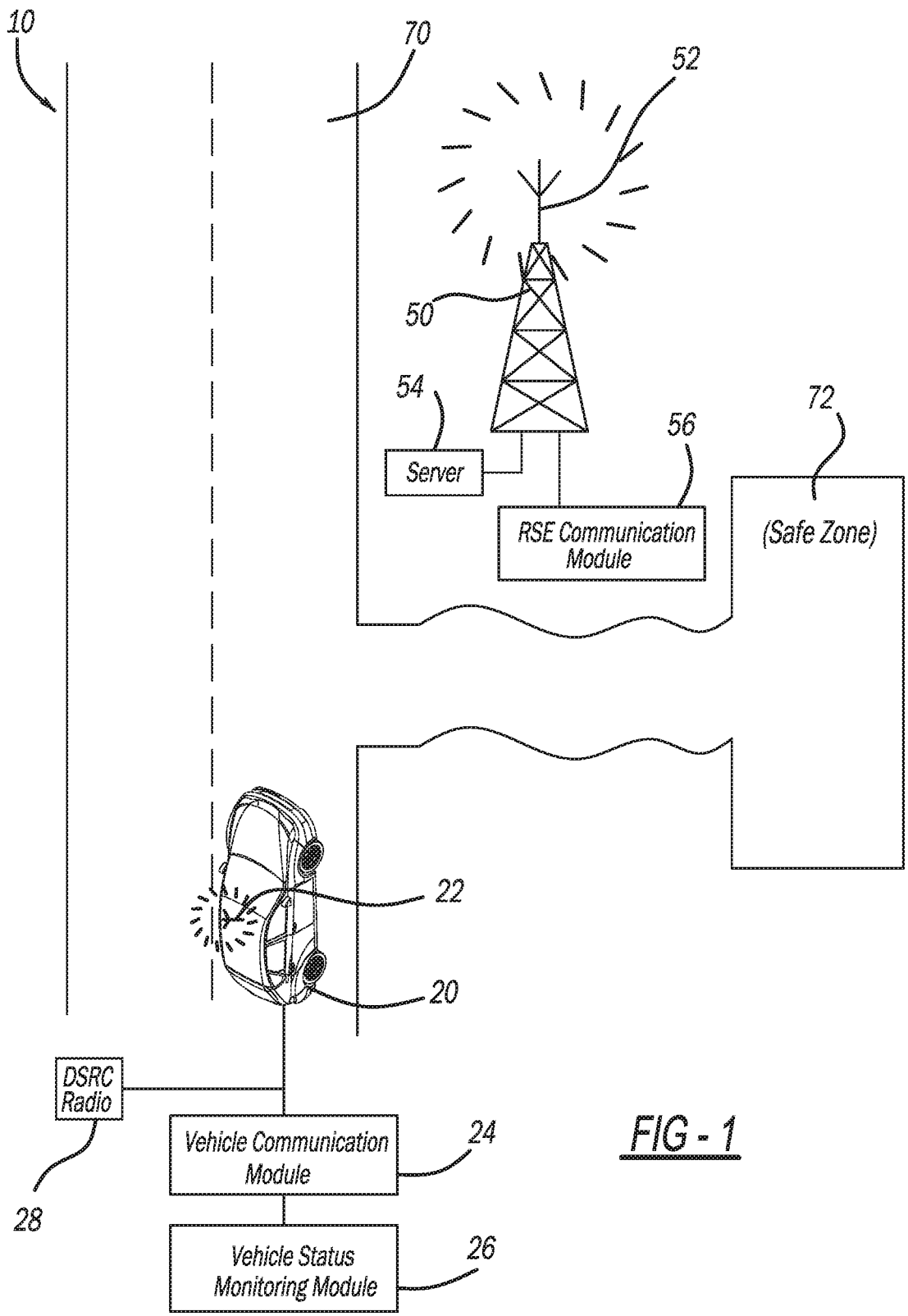
FIG. 1 illustrates a system in accordance with the present disclosure for receiving basic safety messages, and to communicate with an internet server at a safe zone.

With initial reference to FIG. 1, a system in accordance with the present disclosure for receiving basic safety messages (BSMs) and to communicate with an internet server is generally illustrated at reference numeral 10. FIG. 1 illustrates an exemplary vehicle 20, which includes various components of the system 10. The vehicle 20 may be any suitable vehicle, such as any suitable passenger vehicle, mass transit vehicle, military vehicle/equipment, construction vehicle/equipment, recreational vehicle, watercraft, etc. The vehicle 20 includes an antenna 22, which can be any suitable radio frequency antenna for communication with any suitable road-side equipment (RSE) 50 having an antenna 52. The vehicle 20 further includes a vehicle communication module 24, a vehicle status monitoring module 26, and a dedicated short range communication (DSRC) radio 28. As explained further herein, the system 10 advantageously operates sufficiently with only a single DSRC radio 28.

In this application, including the definitions below, the term "module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The vehicle status monitoring module 26 receives inputs from various sensors of the vehicle 20 identifying various operational parameters of the vehicle 20, such as, but not limited to, the following: current 3D position of the vehicle 20 (such as latitude, longitude, and elevation), speed, heading, brake and turn signal status, and any other relevant vehicle information. The vehicle status monitoring module 26 inputs the vehicle information to the vehicle communication module 24, which generates a basic safety message (BSM) including the vehicle information. The vehicle communication module 24 operates the DSRC radio 28 to transmit the BSMs from the vehicle 20 by way of the antenna 22 to the antenna 52 of road-side equipment (RSE) 50, as well as to other vehicles proximate to the vehicle 20. The BSM is transmitted by the DSRC radio 28 on a single, pre-defined DSRC channel referred to as the "safety channel," thus it is necessary for the vehicle 20 and other DSRC vehicles to have the DSRC radio 28 tuned to the safety channel so they can reliably receive BSMs from surrounding vehicles. The antenna 52 may be a directional antenna directing IP communications in the direction of safe zone 72 (or any other suitable direction) to minimize interference with surrounding vehicles.

The RSE 50 may be any suitable road-side equipment placed at any suitable location, such as proximate to a road 70 upon which the vehicle 20 and other vehicles are travelling. The RSE 50 may be a stand-alone tower, for example, or be mounted to any suitable infrastructure, such as stop lights, street signs, buildings, overpasses, tunnels, bridges, etc. The RSE 50 includes an RSE communication module 56, which may relay BSMs received from the vehicle 20 to other nearby vehicles to inform them of the operating status of the vehicle 20 to enhance safe operation of the vehicle 20 and surrounding vehicles. Furthermore, in some applications the RSE communication module 56 may be configured to operate the antenna 52 to transmit to the vehicle 20 BSMs received from other nearby vehicles to inform the vehicle 20 of the operating status of the nearby vehicles, and further improve safety. The RSE communication module 56 may also facilitate vehicle safety by transmitting information to the vehicle 20 and other nearby vehicles regarding traffic signal status by way of signal phase and timing (SPAT) and map messages.

The RSE 50 is in communication with any suitable server 54, such as an internet server. The RSE communication module 56 is configured to provide dedicated short range communication (DSRC) between the server 54 and the vehicle communication module 24 of the vehicle 20, and any other nearby vehicles. Specifically, the RSE communication module 56 transmits, by way of the antenna 52 and over the DSRC safety channel, a wireless access in vehicular environments (WAVE) service advertisement (WSA) message(s) to advertise internet connectivity (such as IPv6 connectivity) with the server 54. IEEE 1609.3 defines the WSA further, as is known in the art. Within IEEE 1609.3, a 0-31 byte optional field named the provider service context (PSC) exists within the WSA that will be used. The WSA is secured using any suitable security method defined in IEEE 1609.2, as is the case with known WSAs. SAE J2945/1 also defines the use of channel busy percentage (CBP) to measure the current level of congestion on the DSRC channel.

Under appropriate conditions, as described herein, the vehicle communication module 24 will establish an IP connection to the server 54 by way of DSRC radio communication between the DSRC radio 28 and the RSE 50 and antenna 52. The server 54 may be any suitable server, such as a security credential management system (SCMS), which may be used to provision and maintain security certificates on the vehicle communication module 24. The vehicle communication module 24 may also detect if other vehicle-to-vehicle/infrastructure (V2X) devices executing on the safety channel are acting incorrectly, or "misbehaving." In some cases, the vehicle communication module 24 may generate a misbehavior report and need to upload it to the SCMS server 54 for further analysis and potential certification revocation of another V2X device.

In the example of FIG. 1, the WSA transmitted by the RSE 50 identifies a safe zone 72 in any suitable manner, such as by transmitted geo-fence coordinate information. The safe zone 72 can be any location where the vehicle 20 is not in danger of being struck by other vehicles, such as a parking lot. Once in the safe zone 72, the vehicle communication module 24 may safely switch the DSRC radio 28 off of the safety channel, and to any other suitable channel for communicating with the RSE 50 and ultimately the server 54 by way of DSRC communication. The IP connectivity service advertised by the WSA will indicate the non-safety DSRC channel that the IP connectivity to the server 54 is available on. The safe zone 72 is any suitable area away from most vehicle traffic. Examples include a factory parking lot, dealership parking lot, or some other area in which a driver may be notified that the V2X safety system has been temporarily disabled. The geo-fence area may be identified with outdoor signage to aid in locating it. An in-vehicle message or display indicating the location of the safe zone 72 may also be provided to the driver of the vehicle 20. Once the vehicle 20 leaves the safe zone 72 the vehicle communication module 24 will cease IP communication with the server 54, and will return the DSRC radio 28 to the safety channel to resume normal transmission and receipt of BSMs.

The provider service identifier (PSID) used to indicate IP connectivity (such as IPv6 connectivity) may be the same PSID used for all other V2X IP connectivity. Alternatively, the PSID may be a unique PSID designated specifically for advertising IP connectivity in a "safe" environment. Within the WSA being transmitted, the provider service context (PSC) field contains geo-fence information defining the area in which the vehicle communication module 24 may stop transmitting BSMs and have its single DSRC radio 28 tune away from the safety channel and perform the necessary IP communication with the server 54 by way of the RSE 50. The PSC may include each of the absolute points, or to conserve space, the values in the PSC may be relative offsets to the RSE 3D position contained within the WSA header. Examples of two WSA PSC encodings (maximum of 31 characters allowed) are as follows: Example 1 (4 points, relative from position in WSA header, scaled by factor of N meters), −99, −99; +10, +20; −50, +45; +78, −34. Example 2 (circle, defined latitude, longitude and radius in meters): −117.1234567, 33.1234567, 999.

Figure 2:
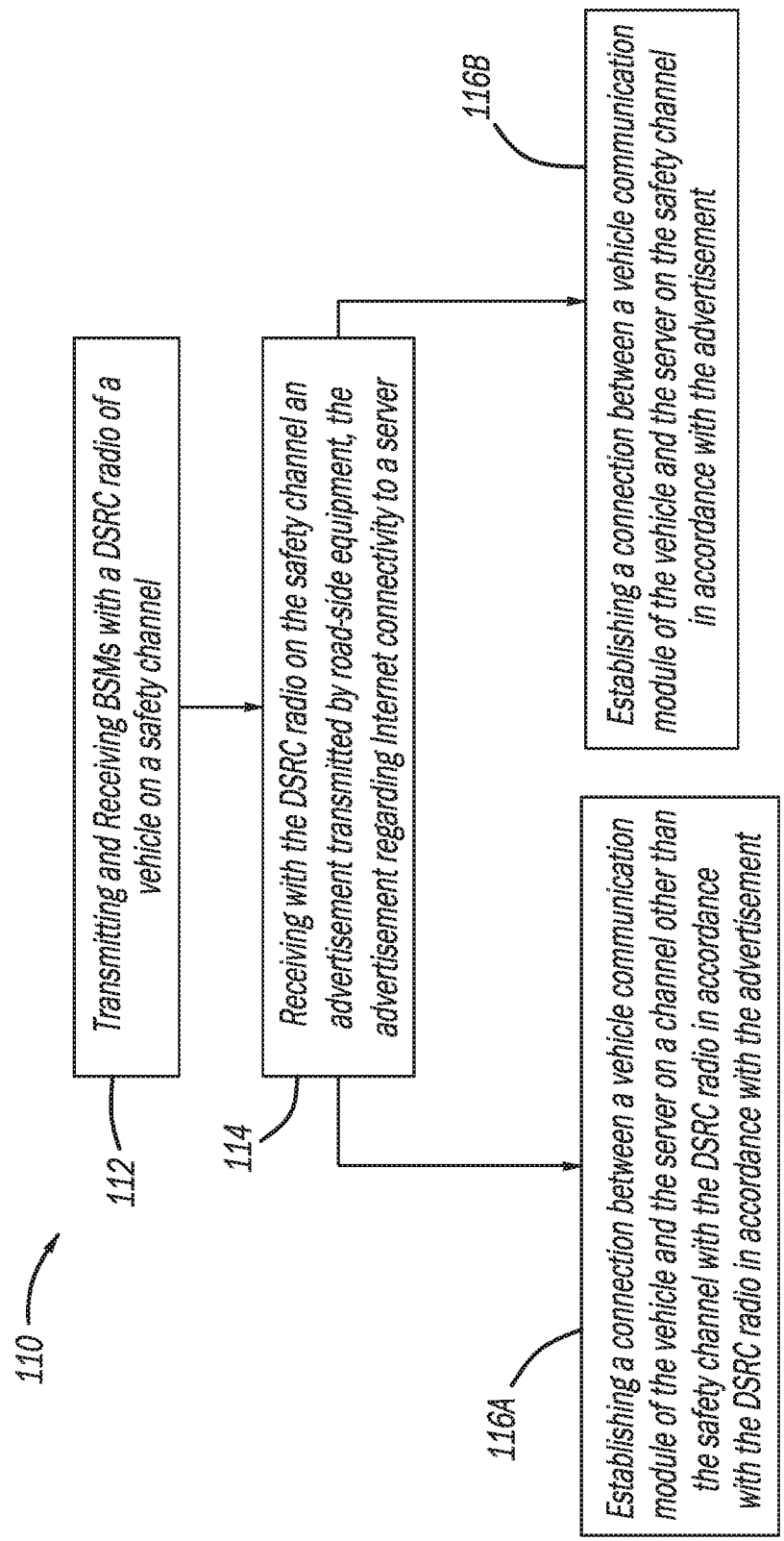
FIG. 2 illustrates methods for using a single dedicated short range communication (DSRC) radio of a vehicle to receive basic safety messages and to communicate with an internet server.

With continued reference to FIG. 1, and additional reference to FIG. 2, exemplary methods in accordance with the present disclosure for using a single dedicated short range communication (DSRC) radio, such as the DSRC radio 28, to receive BSMs and to communicate with the internet server 54 are generally illustrated at reference numeral 110. The methods 110 can be performed by the system 10, or any other suitable system for receiving BSMs and communicating with an internet server. With reference to block 112, the methods 110 include transmitting and receiving BSMs with the DSRC radio 28 of the vehicle 20 on a DSRC safety channel. With reference to block 114, the DSRC radio 82 receives on the safety channel the WAVE service advertisement (WSA) transmitted by the RSE 50. The WSA advertises internet connectivity to the server 54 (such as IPv6 connectivity).

In the example of FIG. 1, the WSA includes coordinates to the safe zone 72. When the vehicle 20 is at the safe zone 72, one of the methods 110 proceeds to block 116A. At block 116A, the vehicle communication module 24 operates the DSRC radio 28 to switch off of the safety channel and to the IP connectivity channel specified in the WSA. Once on the IP connectivity channel, the vehicle communication module 24 establishes a connection with the server 54 by way of DSRC communication between the DSRC radio 28 and the RSE 50. Once the vehicle communication module 24 is connected to the server 54, any suitable IP communication may be carried out. For example and when the server 54 is an SCMS server, updated security certificates may be downloaded therefrom to the vehicle communication module 24. The vehicle communication module 24 may also upload a misbehavior report to the SCMS by way of the single DSRC radio 28 for further analysis by the SCMS server 54. The misbehavior report identifies incorrect operation of secondary communication modules of secondary vehicles, as described above.

Figure 3:
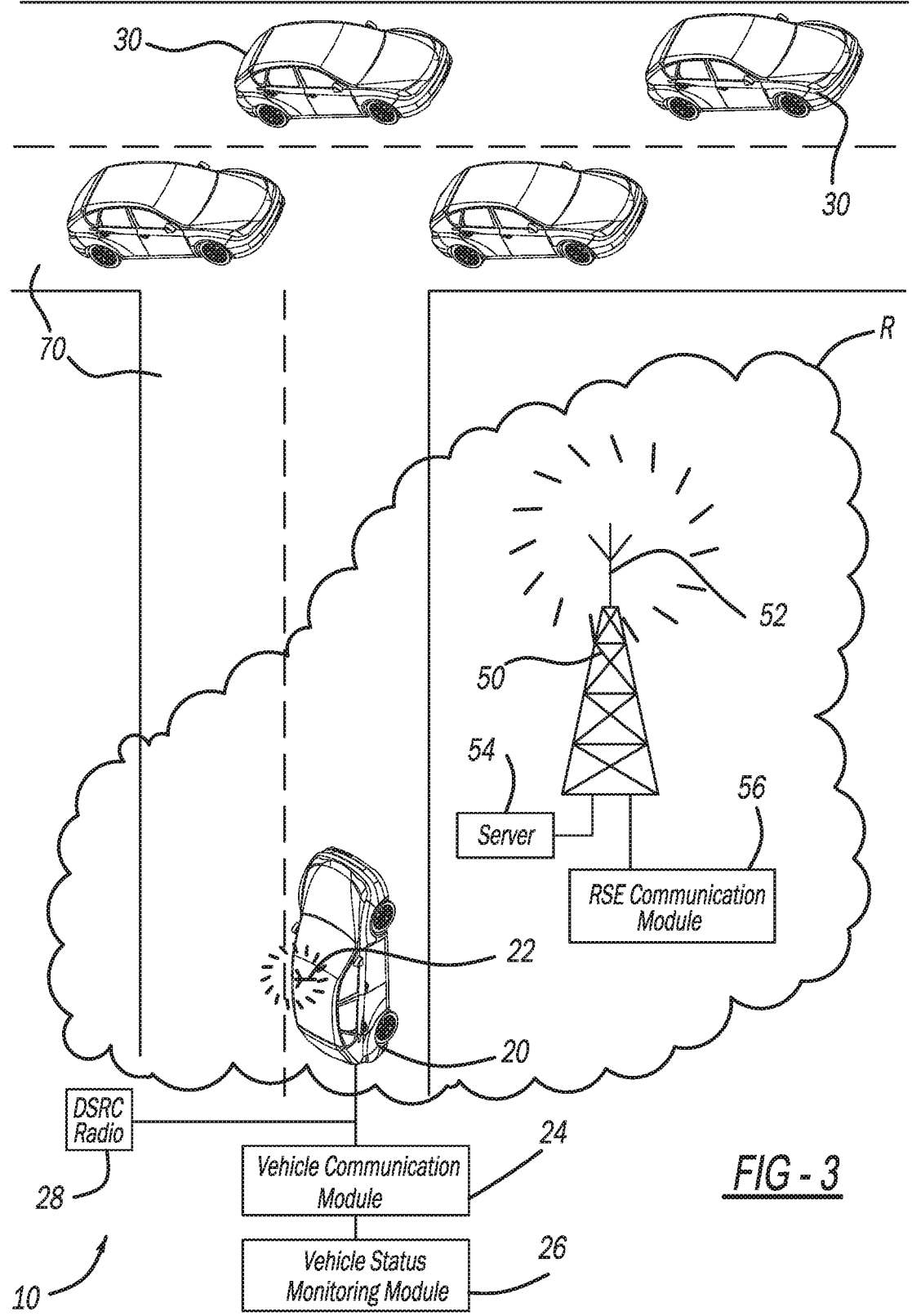
FIG. 3 illustrates modified operation of the system of FIG. 1.

With reference to block 116B, the IP connection established between the vehicle communication module 24 and the server 54 may take place on the safety channel in accordance with another one of the methods 110. With reference to FIG. 3, for example, the system 10 is modified from the configuration of FIG. 1 in order to allow IP communication over the safety channel, but at reduced power as compared to power used to transmit and receive BSMs. Specifically, the WSA transmitted by the RSE 50 indicates that the RSE 50 (and specifically the RSE communication module 56 thereof) is able to perform IP communication on the DSRC safety channel in a low power mode (which is at a power level lower than the power used to transmit and receive BSMs). Thus when the vehicle 20 is within range R of the RSE 50 where the DSRC radio 28 of the vehicle 20 and the RSE 50 are able to communicate at reduced power, IP communication takes place between the vehicle communication module 24 and the server 54 by way of signals exchanged between the DSRC radio 28 and the RSE 50 over the DSRC safety channel. Because the IP communication takes place at reduced power, secondary vehicles 30, which are outside of the low power range R, are not negatively affected by the IP transmission, and are thus able to transmit and receive BSM safety messages over the DSRC safety channel.

The PSID being used for the WSA that indicates IP connectivity may be the same PSID for all other V2X IP connectivity. Optionally, it may be a unique PSID designated specifically for advertising IP connectivity in a low power mode. Within the WSA being transmitted is the "channel info segment." The IP service being advertised is set up so a lower power setting is advertised to all users. This results in any vehicle communication modules 24 connecting to the service transmitting their IP messages using a low power setting on the safety channel. Therefore, the messages will not travel as far and will not cause unnecessary congestion to other secondary vehicles 30 nearby. When the RSE 50 advertising this low power IP connectivity transmits any IP messages on the safety channel, the RSE 50 uses the low power transmit setting. This limits the amount of congestion to the secondary vehicles 30 from the IP messages transmitted by the RSE 50. As long as the vehicle 20 stays within the low power range R, IP transactions on the safety channel to communicate with the server 54 (such as the SCMS 54) can take place.

Most DSRC messages are transmitted at 20 or 23 dBm, and the communication range is 300 meters or more. In this context, the low power mode described above uses a transmit power of approximately 0 dBm and has a communication range of 100 meters or less. When the DSRC radio 28 no longer receives the WSAs from the RSE 50 advertising low power IP connectivity, the vehicle communication module 24 instructs the DSRC radio 28 to stop IP communication on the safety channel.

Figure 4:
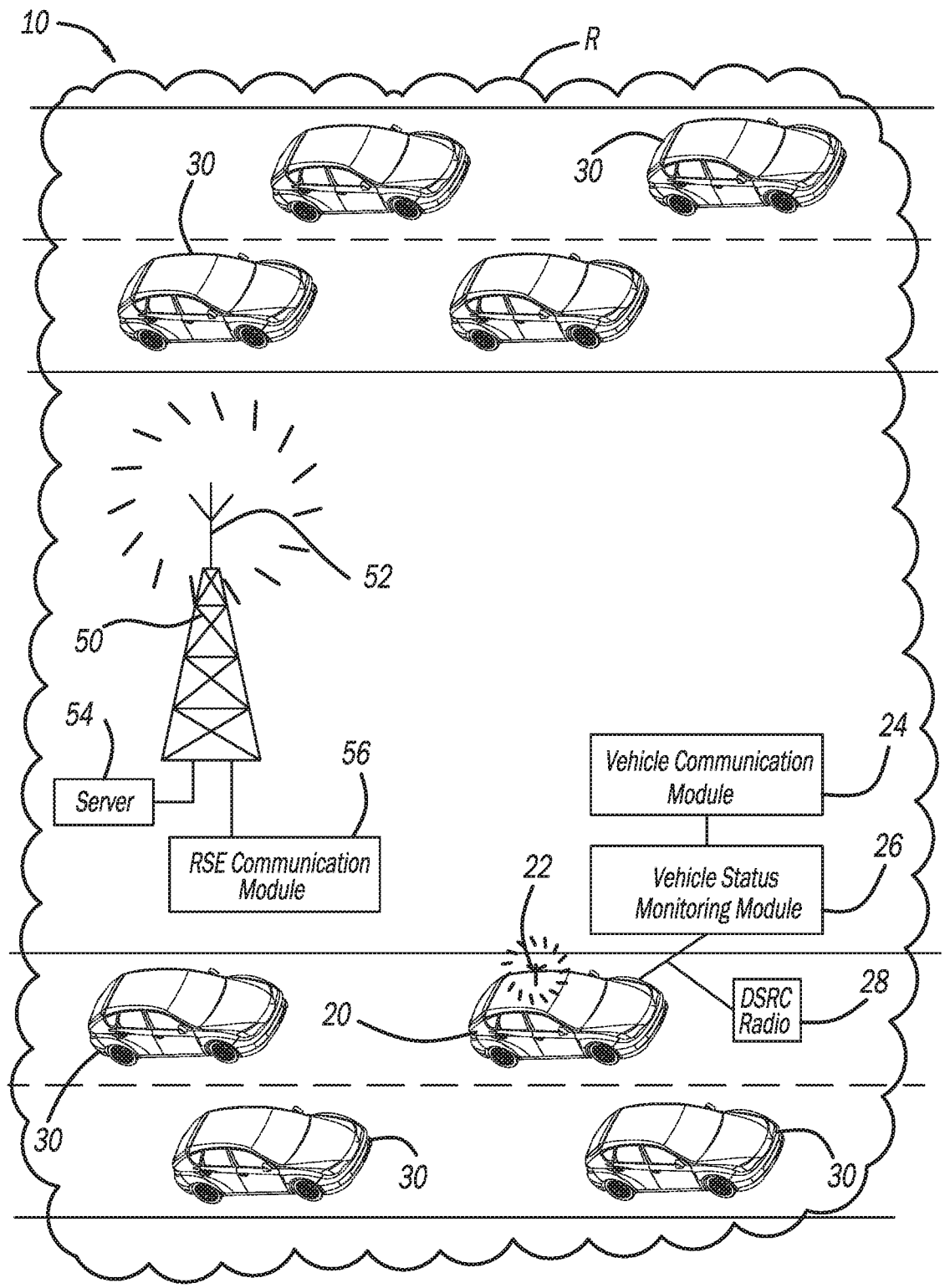
FIG. 4 illustrates an additional modified operation of the system of FIG. 1.

FIG. 4 illustrates another example of the system 10 being used for IP communication on the DSRC safety channel as set forth at block 116B of one of the methods 110. Specifically, in the example of FIG. 4, the RSE communication module 56 transmits by DSRC over the safety channel a WSA indicating that the RSE communication module 56 is allowed to perform IP communication on the safety channel as long as channel congestion is below a predetermined level. Specifically, the RSE communication module 56 monitors the safety channel congestion level and may only transmit the WSA with the IP advertisement if the measured channel busy percentage (CBP) indicates that there is very little usage of the safety channel in the immediate area. An example of a predetermined low congestion level is a CBP of less than 20%, which is an estimate that may be changed based on the particular application. The RSE communication module 56 may only transmit the IP data (such as IPv6 data) on the safety channel if the measured CBP is below the defined threshold. The RSE communication module 56 may include the CBP threshold value with the PSC field of the WSA corresponding to the advertised IP connectivity service. The vehicle communication module 24 measures the current CBP value and compares it to either a predefined threshold value or the value in the WSA PSC. If the measured value is less than the threshold value, then the vehicle communication module 24 is allowed to initiate IP communications on the DSRC safety channel. The vehicle communication module 24 continues to monitor the CBP value as it continues to perform IP communications. If the CBP exceeds the threshold value, the vehicle communication module 24 will terminate all IP communication on the safety channel and continue with standard BSM operations on the DSRC safety channel.

The present disclosure thus provides for numerous advantages. For example, the systems 10 and the methods 110 provide for V2X communication using the single DSRC radio 28 per vehicle, and safely performing IP communication for the purposes of communicating with the server 54, while not negatively impacting DSRC safety channel congestion for other vehicles. Providing such functionality with only a single DSRC radio 28 aboard the vehicle 20 advantageously reduces costs, simplifies installation, and simplifies operation. Thus downloading security certificates and other critical information to the vehicle 20, and transmitting/receiving BSMs can all be performed using a single DSRC radio 28. With respect to downloading security certificates and other critical information, this may be necessary when the vehicle 20 is first released from the factory, located at a dealership, or after the vehicle is already in the possession of the end consumer. A second use case includes uploading information to the server 54 from the vehicle communication module 24, with an example being misbehavior reports generated by the vehicle communication module 24. One skilled in the art will appreciate that the present disclosure provides numerous additional advantages and unexpected results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for using a single dedicated short range communication (DSRC) radio of a vehicle to receive basic safety messages (BSMs) and to communicate with an internet server, the method comprising:
   transmitting and receiving BSMs with the single DSRC radio of the vehicle on a safety channel;
   receiving with the single DSRC radio on the safety channel an advertisement transmitted by road-side equipment, the advertisement regarding internet connectivity to a server; and
   establishing a connection between a vehicle communication module of the vehicle and the server with the DSRC radio in accordance with the advertisement;
   wherein:
      the advertisement includes geo-fence information identifying location of a safe zone predetermined to be a location where an operator of the vehicle may safely access the internet with minimal danger of an accident between the vehicle and another vehicle;
      the vehicle communication module is configured to establish a connection with the internet server using the DSRC radio in accordance with the advertisement when the vehicle is in the safe zone; and the vehicle communication module is configured to not establish a connection with the internet server using the DSRC radio when the vehicle is outside of the safe zone.

2. The method of claim 1, wherein the connection between the vehicle communication module of the vehicle and the server with the DSRC radio is on the safety channel.

3. The method of claim 1, wherein the connection between the vehicle communication module of the vehicle and the server with the DSRC radio is on a channel other than the safety channel.

4. The method of claim 1, wherein no radios other than the single DSRC radio are included with the vehicle.

5. The method of claim 1, wherein the server is a security credential management system (SCMS) that provisions and maintains security certificates;

the method further comprising downloading security certificates from the SCMS to the vehicle communication module of the vehicle.

6. The method of claim 1, wherein the server is a security credential management system (SCMS) that provisions and maintains security certificates;

the method further comprising uploading a misbehavior report to SCMS by way of the single DSRC radio for analysis by the SCMS, the misbehavior report identifying incorrect operation of a secondary communication module of a secondary vehicle.

7. The method of claim 1, wherein the connection between the vehicle communication module of the vehicle and the server with the DSRC radio includes communication between an antenna of the vehicle and a directional antenna of the road-side equipment to minimize interference with surrounding vehicles.

8. The method of claim 1, wherein the connection between the vehicle communication module of the vehicle and the server with the DSRC radio is on the safety channel at a power level that is lower than a power level used for the transmitting and receiving of the BSMs.

9. The method of claim 1, wherein establishing the connection between the vehicle communication module of the vehicle and the server with the DSRC radio on the safety channel is restricted by a road-side equipment (RSE) communication module when the RSE communication module determines that vehicle congestion proximate to the RSE communication module is at or above a predetermined level.

10. The method of claim 9, wherein establishing the connection between the vehicle communication module of the vehicle and the server with the DSRC radio on the safety channel is permitted by a road-side equipment (RSE) communication module when the RSE communication module determines that vehicle congestion proximate to the RSE communication module is below the predetermined level.

11. The method of claim 10, wherein the predetermined level is a channel busy percentage of 20%.

12. The method of claim 1, further comprising the road-side equipment receiving BSMs from the vehicle and other vehicles, and the road-side equipment transmitting the BSMs.

13. A system for receiving/transmitting basic safety messages (BSMs) and to communicate with an internet server, the system comprising:

a dedicated short range communication (DSRC) radio for a vehicle that transmits and receives BSMs on a safety channel;

a road-side equipment communication module that receives and transmits BSMs, and transmits an advertisement regarding internet connectivity to a server; and a vehicle communication module for the vehicle that establishes a connection with the server using the DSRC radio pursuant to instructions set forth in the advertisement;

wherein:

the advertisement includes geo-fence information identifying location of a safe zone predetermined to be a location where an operator of the vehicle may safely access the internet with minimal danger of an accident between the vehicle and another vehicle;

the vehicle communication module is configured to establish a connection with the internet server using the DSRC radio in accordance with the advertisement when the vehicle is in the safe zone; and the vehicle communication module is configured to not establish a connection with the internet server using the DSRC radio when the vehicle is outside of the safe zone.

14. The system of claim 13, wherein the connection between the vehicle communication module of the vehicle and the server with the DSRC radio is on the safety channel.

15. The system of claim 13, wherein the connection between the vehicle communication module of the vehicle and the server with the DSRC radio is on a channel other than the safety channel.

16. The system of claim 13, wherein the server is a security credential management system (SCMS).

17. A method for using a single dedicated short range communication (DSRC) radio of a vehicle to receive basic safety messages (BSMs) and for communicating with an internet server, the method comprising:

transmitting and receiving BSMs with the single DSRC radio of the vehicle on a safety channel;

receiving with the single DSRC radio on the safety channel an advertisement transmitted by road-side equipment, the advertisement including geo-fence information identifying location of a safe zone predetermined to be a location where an operator of the vehicle may safely access the internet with minimal danger of an accident between the vehicle and another vehicle;

when the vehicle is in the safe zone, establishing a connection between a vehicle communication module of the vehicle and the internet server with the DSRC radio in accordance with the advertisement; and when the vehicle is outside of the safe zone, preventing the connection between the vehicle communication module of the vehicle and the internet server with the DSRC radio.

18. The method of claim 17, further comprising preventing transmission and reception of BSMs with the single DSRC radio when the vehicle is in the safe zone.

* * * * *